May 13, 1941.   L. S. SHELDRICK   2,241,677
TRACTOR
Filed Dec. 8, 1939   2 Sheets-Sheet 1

WITNESS
E. Witzke

INVENTOR
L. S. Sheldrick
BY Edwin C. McRae
E. L. Davis
ATTORNEYS.

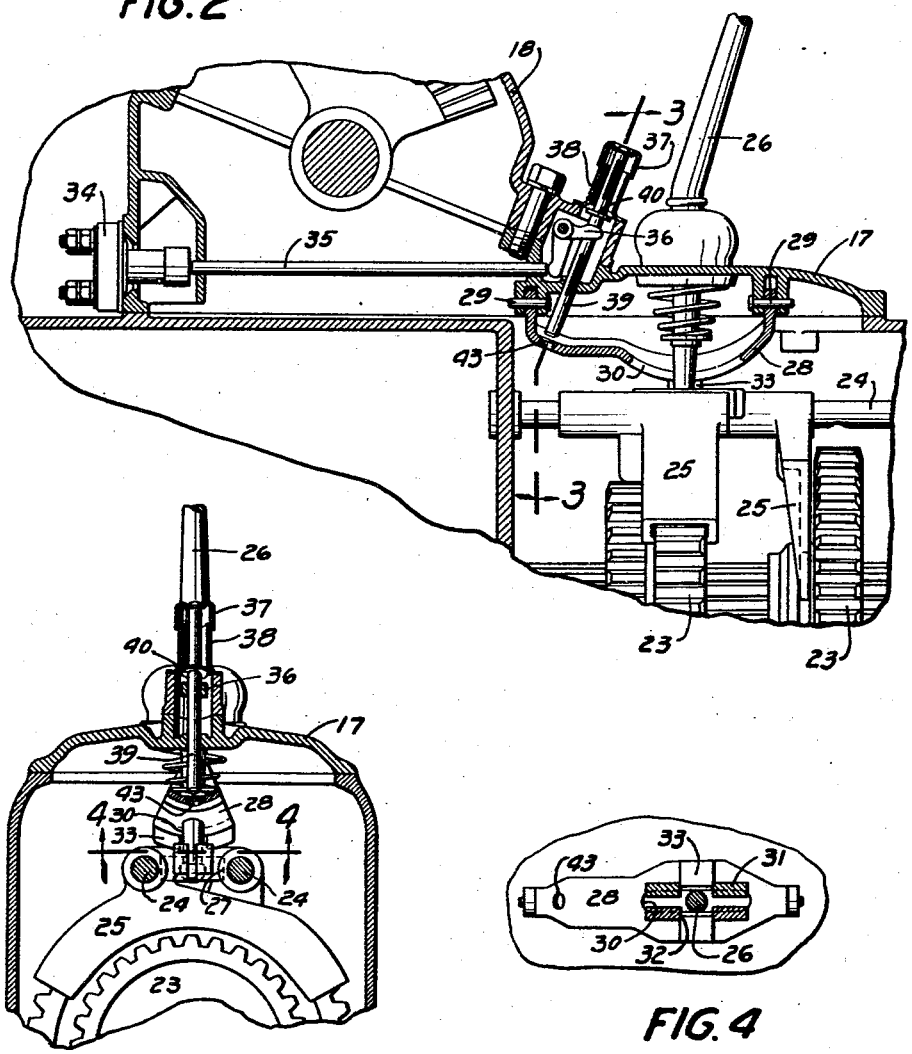

Patented May 13, 1941

2,241,677

UNITED STATES PATENT OFFICE 2,241,677

TRACTOR

Laurence S. Sheldrick, Dearborn, Mich., assignor to Ford Motor Company, Dearborn, Mich., a corporation of Delaware Application December 8, 1939, Serial No. 308,141

1 Claim. (Cl. 123—179)

The object of my invention is to provide a tractor having a starting mechanism thereon, which tractor will eliminate certain hazards heretofore inherent in other starter equipped tractors.

Electric starters were first used on automobiles and then later provided on tractors. In an automobile installation the control button or starter switch was invariably placed in such position that the driver could start the engine only when sitting in the driver's seat. This prevented the accidental starting of the car with no driver.

When electric starters are installed on tractors the starter switch must be placed in a position which is accessible for operation either when sitting on the seat or standing alongside of the tractor, as any position on the tractor which is accessible to the driver when he is sitting in the driver's seat is equally accessible when he is standing alongside the tractor. It frequently has happened that persons, while standing alongside a tractor in position between the front rear wheels, have accidentally pushed the starting button. If the tractor is in gear when this occurs the tractor is caused to lurch forwardly and the person directly in the path of the wheels may be seriously injured.

My improved tractor is designed to eliminate this hazard by so interlocking the starting mechanism that it may be actuated to start the engine only when the transmission is in a neutral position. Thus, a person may accidentally lean against the starting switch when the transmission is in gear but the switch will then be able to operate the starting motor. However, should the transmission be in neutral the engine may start but the tractor will not be driven thereby.

Specifically my invention comprises a novel starting switch control button which is adapted to be interlocked with the transmission gear shifter so that the starting switch may be operated only when the transmission is in neutral.

With these and other objects in view, my invention consists in the arrangement, construction and combination of the various parts of my improved device, as described in this specification, claimed in my claim, and illustrated in the accompanying drawings, in which:

Figure 2 is a vertical central sectional view through the transmission and starting mechanism, illustrating the mechanical interlocking therebetween.

Figure 3 is a sectional view, taken on the line 3—3 of Fig. 2, and,

Figure 4 is a sectional view, taken on the line 4—4 of Fig. 3.

Figure 1:
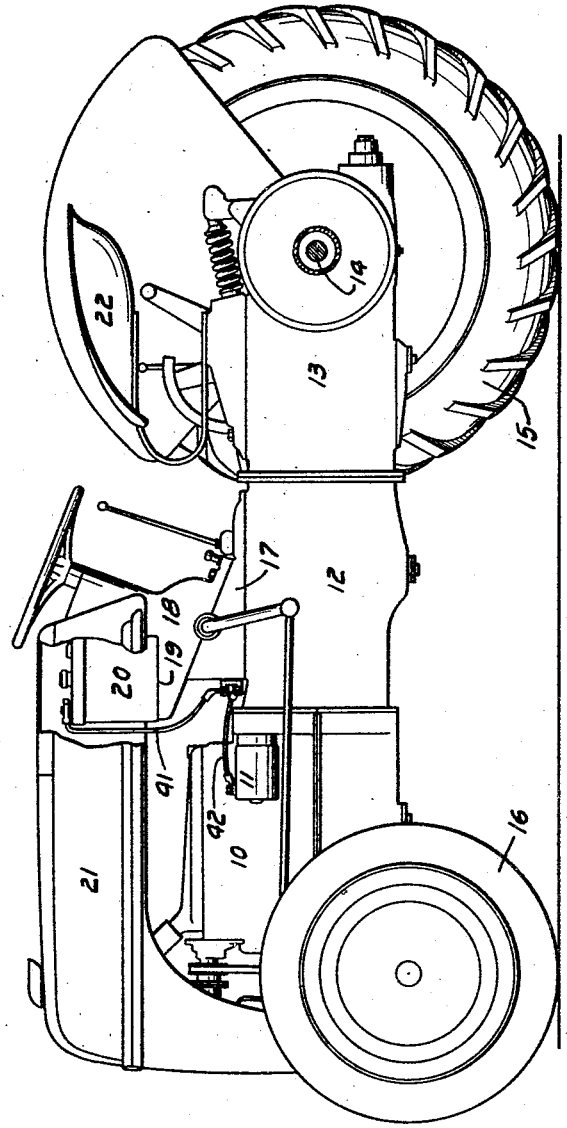
Figure 1 is a side elevation of a tractor having my improved starting mechanism installed thereon, one of the rear wheels and a portion of the cowl being broken away to better illustrate the construction.

Referring to the accompanying drawings, I have used the reference numeral 10 to indicate a conventional internal combustion engine which is associated with my improved tractor. An electrically operated starting motor 11 is secured to the engine in the usual manner. A transmission housing 12 is bolted to the flywheel end of the motor 11 and a rear axle housing 13 is attached to the rear end of the transmission housing 12. Axle shafts 14 are rotatably mounted in the housing 13 and a pair of rear wheels 15 are secured to the outer ends of the shafts 14. Front wheels 16 are mounted at the front end of the tractor on the outer ends of an axle, not shown in the drawings.

A transmission cover member 17 is detachably secured over the upper face of the transmission housing 12 and a combined cowl, steering gear housing and battery support 18 is detachably secured over the upper face of the cover 17. It will be noted that a shelf 19 projects forwardly from the housing 18 and a battery 20 is mounted upon this shelf 19. A sheet metal hood 21 extends from the front of the tractor rearwardly to position over the battery 20, the rear end of this hood coacting with the cowl portion 18. A seat 22 is fastened to the top portion of the rear axle housing 13 in position just rearwardly of the transmission housing 12.

The tractor construction just described brings out one tractor to which my invention is applicable, but it should be noted that my invention is adapted to be readily incorporated into other standard tractor constructions.

Referring to Figs. 2 and 3 of the drawings, I have shown a transmission which is provided with a plurality of gears therein, which gears have been given the general reference numeral 23. A pair of parallel shifter shafts 24 are fixedly mounted side by side in the transmission and extend lengthwise of the tractor. A pair of shifter forks 25 are reciprocally mounted on the shafts 24 and coact with the gears 23 so that when these forks are shifted horizontally fore and aft from a neutral position on the shafts the various speed ratios in the transmission will be effected.

A vertical gearshift lever 26 is universally mounted in a suitable bearing in the upper portion of the cover 17 with its lower end extending downwardly to position between the forks 25. Each of these forks are provided with a notch 27 therein into which the lower end of the fork may be moved so that when the lever engages either notch the respective fork may be moved longitudinally by movement of the upper end of the lever. The notches 27 in the two shifter forks 25 are aligned with each other when the forks are in a neutral or intermediate position.

In order that two speeds of the transmission may not be simultaneously engaged, I have provided an interlocking mechanism which consists of a yoke 28 which is pivotally mounted on pins 29 in the cover 17 to rock laterally beneath the cover. This yoke is provided with a longitudinally extending slot 30 therein through which the lower end of the lever 26 extends. The lever may therefore be moved in a fore and aft direction without rocking or otherwise moving the yoke 28 but when the lever is moved laterally, then the yoke 28 is rocked around its pivot pins 29.

Each of the forks 25 is provided with an interlocking boss 31 formed at its upper edge in which a transversely extending interlocking slot 32 is machined. The yoke 28 is also provided with a pair of lugs 33 which project downwardly therefrom and which, when the yoke is in a vertical or neutral position, engage the respective slots 32 in the boss 31. In this neutral position neither of the forks 25 may thus be shifted longitudinally. However, when the lever 26 is moved laterally to engage one of the notches 27, then the yoke 28 is rocked laterally to position where one of the lugs 33 swings clear of the slot 32 in the engaged fork. The other lug 33 still engages the slot 32 in the other shifter fork and thus effectively prevents this last-mentioned shifter fork from movement in either direction from its neutral position.

The foregoing interlocking mechanism forms no part of my invention but is described to show that when the transmission is in any of its engaged positions that the yoke 28 must necessarily be rocked to one side or the other of its intermediate vertical position. This characteristic of the transmission is made use of to interlock the starting motor switch so that it may be operated only when the transmission is in its neutral position.

A conventional starting motor switch 34 is fixed to the forward wall of the cover member 17 in a horizontal position and a push rod 35 is reciprocally mounted in a horizontal plane through the cover member in position to engage the switch. A bell crank lever 36 is pivotally mounted in the housing 18, one arm of which engages the adjacent end of the rod 35 while the other end extends rearwardly where it is engaged by a pin 39 which is fixed to a foot actuated starter button 37. The starter button 37 is reciprocally supported by a sleeve 38 which is fastened on the housing 18 in a vertical position. The pin 39 is secured to the button 37 and extends downwardly through a suitable opening in the transmission cover 17. A shoulder 40 is formed on the intermediate portion of the pin 39 and coacts with the free end of the bell crank lever 36 so that when the starter button 37 is pressed downwardly the bell crank 36 will be oscillated to thereby push the rod 35 forwardly and thus engage the starting motor switch 35.

One terminal of the battery 20 is grounded in the conventional manner while a cable 41 extends from the other terminal to one terminal of the starting motor switch 34. A cable 42 extends from the other terminal of the switch 34 to a terminal on the starting motor 11. Thus, when the button 37 is depressed the switch 34 will be engaged to energize the starting motor 11 from the battery 20.

In order that the operator will be unable to depress the button 37 when the transmission is in an engaged position, I have formed the pin 39 so that in its upper position it extends downwardly to position just above the yoke 30. A suitable opening 43 is provided in the yoke 28 which is in alignment with the pin 39 when the yoke is in an intermediate position. When the yoke is rocked to one side or the other, as is necessary when the transmission is in any one of its engaged positions, the opening 43 becomes out of alignment with the pin 39 so that this pin may not then be moved downwardly. However, when the shift lever 37 is in its neutral position wherein none of the speeds of the transmission is engaged, then the yoke 28 will be in position where the opening 43 is aligned with the pin 39 so that the starting motor switch may be actuated.

Among the many advantages arising from the use of my improved construction, it may be well to mention that the operator or bystander may not either intentionally or accidentally engage the starting switch while the transmission is in gear. Thus, the danger of being run down by the accidental touching of the starting motor button is eliminated.

Some changes may be made in the arrangement, construction and combination of the various parts of my improved device, without departing from the spirit of my invention, and it is my intention to cover by my claim such changes as may reasonably be included within the scope thereof.

I claim as my invention:

A tractor comprising, an engine, an electrical starting circuit for said engine consisting of a starting motor and battery and starting motor switch, driving wheels, a sliding gear transmission associated with said tractor through which the torque of said engine is transmitted to said driving wheels, a pair of shifting forks in said transmission, a shift lever universally mounted upon the upper part of said transmission, said lever being arranged to swing laterally to selectively engage said forks to then be moved longitudinally to shift the gears associated with the selected fork, a yoke pivotally mounted in said transmission through which said shift lever extends, said yoke being rocked laterally by said lateral swinging movement of said shift lever, a starting button mounted upon said tractor which upon being depressed closses said switch, and a pin extending from said button in axial alignment with an opening in said yoke when the yoke is in a neutral position, said yoke when rocked by said shift lever preventing the depression of said pin, for the purpose described.

LAURENCE S. SHELDRICK.